(12) United States Patent
Boixadera et al.

(10) Patent No.: US 9,363,779 B2
(45) Date of Patent: Jun. 7, 2016

(54) REDUCING INTERFERENCE IN WIRELESS TIME DIVISION DUPLEX SYSTEMS BY MONITORING AND LIMITING TIMING ADVANCE

(75) Inventors: Francesc Boixadera, Cambridge (GB); Craig E. Burnet, Royston (GB); Cyril Valadon, Letchworth Garden City (GB)

(73) Assignee: MStar Semiconductor, Inc., Hsinchu Hsien (TW)

( * ) Notice: Subject to any disclaimer, the term of this patent is extended or adjusted under 35 U.S.C. 154(b) by 220 days.

(21) Appl. No.: 13/230,348

(22) Filed: Sep. 12, 2011

(65) Prior Publication Data

US 2013/0044617 A1    Feb. 21, 2013

(30) Foreign Application Priority Data

Aug. 18, 2011 (EP) ..................................... 11779310

(51) Int. Cl.
*H04W 72/04* (2009.01)
*H04B 7/005* (2006.01)
*H04W 76/06* (2009.01)
*H04W 56/00* (2009.01)
*H04W 36/08* (2009.01)

(52) U.S. Cl.
CPC .......... *H04W 56/0045* (2013.01); *H04W 36/08* (2013.01); *H04W 76/06* (2013.01)

(58) Field of Classification Search
USPC .................. 370/278, 336, 335, 357, 321, 324
See application file for complete search history.

(56) References Cited

U.S. PATENT DOCUMENTS

| | | | | |
|---|---|---|---|---|
| 5,805,576 A | * | 9/1998 | Worley et al. | 370/337 |
| 2012/0322453 A1 | * | 12/2012 | Weng et al. | 455/450 |
| 2013/0070726 A1 | * | 3/2013 | Zhang et al. | 370/331 |

FOREIGN PATENT DOCUMENTS

CN          1855767 A       11/2006

OTHER PUBLICATIONS

Chinese Office Action dated Sep. 9, 2014, 9 pages.

* cited by examiner

*Primary Examiner* — Donald Mills
*Assistant Examiner* — Henry Baron
(74) *Attorney, Agent, or Firm* — Edell, Shapiro & Finnan, LLC

(57) ABSTRACT

Techniques are provided for reducing interference in a wireless network. A user equipment device in a first wireless coverage area of a wireless network using a time division duplex transmission scheme to designate a maximum timing advance value for uplink transmissions based on potential interference between uplink transmissions made by the user equipment device in the first wireless coverage area or at least one other user equipment device in the first wireless coverage area, and downlink transmissions intended for at least one user equipment device in a second wireless coverage area of the wireless network. The maximum timing advance value may be based on relative cell radii or other cell properties of the first and second wireless coverage areas. A base station may determine the maximum timing advance and transmit the maximum timing advance to the user equipment device.

31 Claims, 6 Drawing Sheets

REDUCING INTERFERENCE IN WIRELESS TIME DIVISION DUPLEX SYSTEMS BY MONITORING AND LIMITING TIMING ADVANCE

FIELD OF THE INVENTION

The present disclosure relates to wireless communication devices and systems, and more particularly to reducing interference in wireless time division duplex networks.

BACKGROUND OF THE INVENTION

In wireless communication systems, a time division duplex (TDD) transmission scheme uses the same frequency for both downlink and uplink transmissions. A group of time slots, also known as frames, are allocated and scheduled such that one time slot is used, at a given time, for a downlink or uplink transmission. In contrast, frequency division duplex (FDD) uses different downlink and uplink frequencies. TDD is advantageous when there is an asymmetry between uplink and downlink data rates, or when frequency spectrum is limited. FDD tends to be more efficient when there is symmetry between uplink and downlink data rates. The use of different uplink and downlink frequencies in FDD can also reduce interference.

When a TDD base station starts to broadcast information over a channel, the base station transmits in the first time slots or first subframe. The first subframe is designated for downlink transmissions and is followed by a guard period where no transmissions take place. A second subsequent subframe is designated for uplink transmission from a user equipment device to the base station. Subframes may be associated with a number of uplink time slots or downlink times slots, but are not a combination of uplink and downlink time slots. Although the uplink and downlink transmissions travel at the speed of light, there is a measurable delay from the time a signal is transmitted until the time the transmission is received. The delay is proportional to the distance from the base station to the various mobile users, and vice versa.

Since there is but one base station per cell, TDD timing is controlled from the base station's perspective. The guard period allows the user equipment to transmit uplink transmissions ahead of time using a timing advance scheme such that the uplink transmissions to the base station can be complete within the base station's reception time slots or window, i.e., late or early arriving transmissions may cause interference to neighboring cells, interference to subsequent data frames, or may be undetectable at the base station and may be lost. As cells of increasing radius (e.g., up to 100 kilometers) are employed, the timing advance needed for a given user device increases accordingly. When a cell having a relatively smaller radius is deployed next to a cell having a relatively larger radius, the timing advanced for uplink transmissions in the cell with larger radius can overlap with downlink transmissions in the cell with the smaller radius, thereby causing interference with user devices in the smaller cell.

SUMMARY OF THE INVENTION

Techniques are provided for reducing interference in a wireless network. A user equipment device in a first wireless coverage area of a wireless network using a time division duplex transmission scheme has a maximum transmission timing advance value designated for uplink transmissions based on potential interference between uplink transmissions made by the user equipment device in the first wireless coverage area or at least one other user equipment device in the first wireless coverage area, and downlink transmissions intended for at least one user equipment device in a second wireless coverage area of the wireless network. The maximum timing advance value may be based on relative cell radii or other cell properties of the first and second wireless coverage areas. The first and second wireless coverage areas may be the same, or they may be different and covered by different base stations or antenna deployment schemes. The maximum timing advance value may also be based on potential interference that may be caused by the user equipment device itself.

The wireless network may communicate via a time division long term evolution communication scheme and the maximum timing advance value is designated according to at least one of a cell radius of the first wireless coverage area and a cell radius of the second wireless coverage area, or the maximum timing advance value is designated according to a special subframe format employed by the first wireless coverage area and/or a special subframe format employed by the second wireless coverage area, or combinations thereof.

The wireless network may communicate via a synchronous time division multiple access communication scheme and the maximum timing advance value is designated according to at least one of a cell radius of the first wireless coverage area and a cell radius of the second wireless coverage area. The user equipment device may receive a message from the wireless network comprising information indicating the value of the maximum timing advance. A base station serving the user equipment device may broadcast a common maximum timing advance value to all user equipment devices in the first wireless coverage area or signal a specific maximum timing advance value to each user equipment device in the first wireless coverage area. The maximum timing advance value may be designated based on the location of the user equipment device in the first wireless coverage area. The base station may also signal a maximum timing advance as a range of values.

Furthermore, a call associated with the user equipment device may be dropped when an actual timing advance reaches or exceeds the maximum timing advance value by the user equipment device. A base station covering the first wireless coverage area may detect that the maximum timing advance value has been reached by the user equipment device and take appropriate action. For example, a hand-over procedure may be initiated by the base station, the operating frequency may be changed, UE data may be allocated within subframes that are not adjacent to a downlink-to-uplink transmission transition point, the call may be dropped by the base station, or the user equipment device may detect that the maximum timing advance value has been reached by the user equipment device and the call may be dropped by the user equipment device. The user equipment device may enter an out of service procedure after the call is dropped in order to reestablish call capability. A temporary time restriction may be placed on the user equipment device to prevent the user equipment device from establishing a call via a base station covering the first wireless coverage area.

A base station covering the first wireless coverage area may receive a message comprising information configured to indicate wireless properties of the second wireless coverage area, and the maximum timing advance value may be designated based on those wireless properties. In other examples, the user equipment device may detect a time of arrival and/or received signal strength of signals transmitted from wireless coverage areas neighboring the first wireless coverage area including the second coverage area and designate the timing advance value based on the times of arrival and/or received signal strengths. A message may be sent from the user equipment device to the base station comprising information configured to indicate a current timing advance value employed at the user equipment device. The message may be configured to allow the base station to take appropriate action to prevent the user equipment device from causing interference.

DESCRIPTION OF EXAMPLE EMBODIMENTS

Figure 1A:
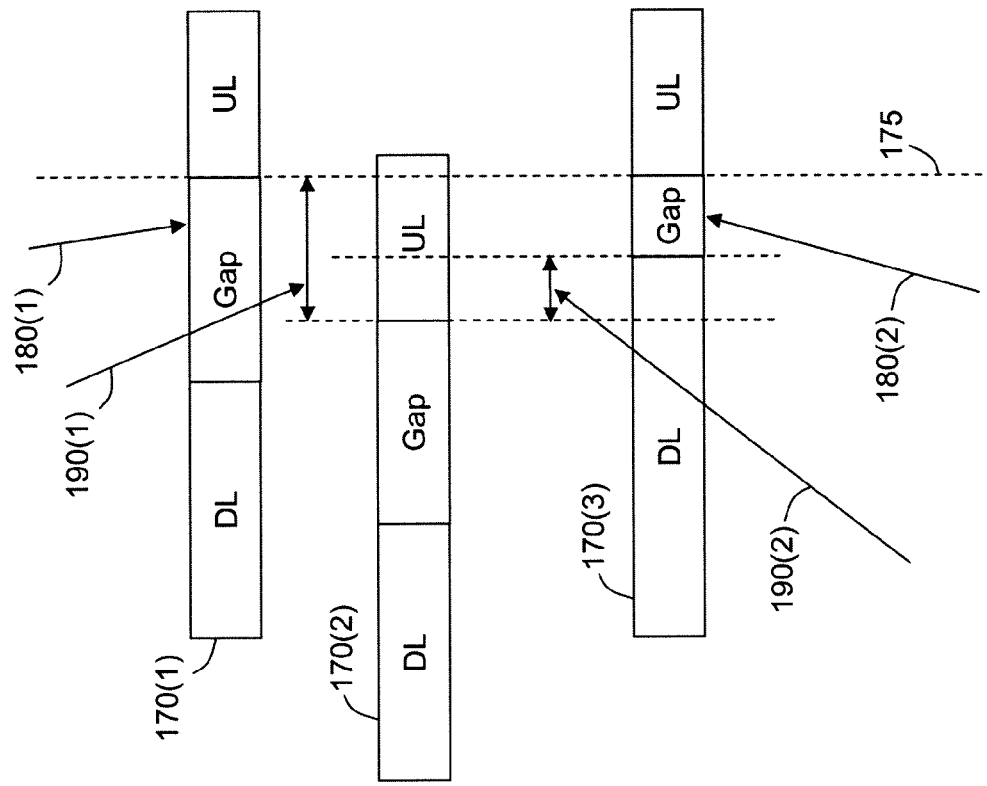
FIG. 1A is a block diagram showing an example of a wireless communication system in which base stations and mobile devices communicate using a time division duplex (TDD) scheme in which potential interference between cells mitigated according to the techniques described herein.

Referring first to FIG. 1A, a wireless time division duplex (TDD) radio communication system 100 is shown. The system 100 comprises a first wireless coverage area 130 and a second wireless coverage area 160. The first wireless coverage area 130 has a base station (BS) 110 and a user equipment (UE) device 120 while the second wireless coverage area 160 has a BS 140 and a UE 150. The UEs 120 and 150 may be fixed or mobile devices. The BSs 110 and 120 may connect to other wired data network facilities (not shown) and in that sense serve as a gateway or access point through which the UEs 120 and 150 have access to those data network facilities.

The BSs 110 and 140 may comprise a plurality of antennas and the UEs 120 and 150 may also comprise a plurality of antennas. The BSs 110 and 140 may wirelessly communicate with individual ones of the UEs 120 and 150 using a wideband wireless communication protocol in which the bandwidth is much larger than the coherent frequency bandwidth. Examples of such wireless communication protocols are Time Division Synchronous Code Division Multiple Access (TD-SCDMA) and Time Division Long Term Evolution (TD-LTE).

Figure 1A:
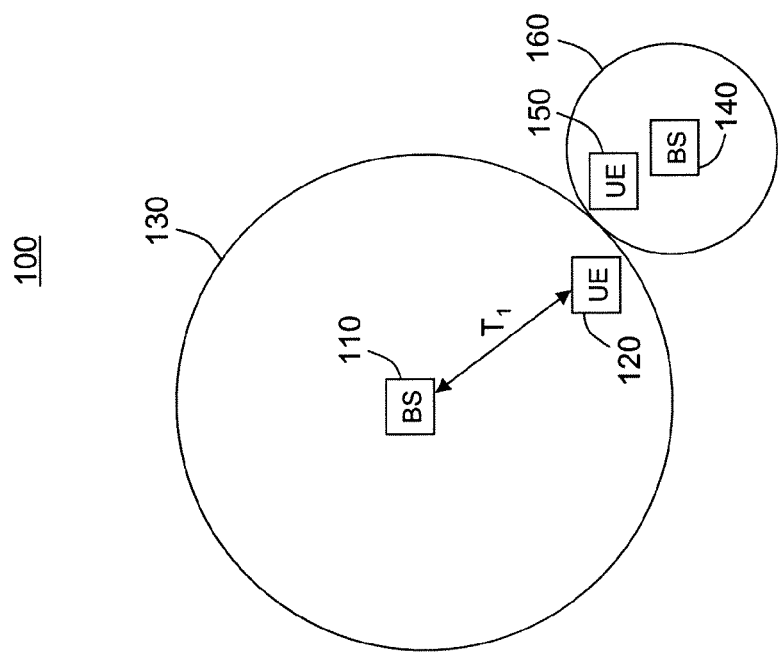

A cell that serves a particular UE may be referred to herein as a "serving cell" and a cell in the vicinity of or adjacent to the serving cell may be referred to herein as a "neighbor" cell. For example, as shown in FIG. 1 the first wireless coverage area 130 serves UE 120 and is a serving cell to UE 120 while the second wireless coverage area 160 serves UE 150 and is a serving cell to UE 150. At the same time the first wireless coverage area 130 and the second wireless coverage area 160 are neighbors of each other.

Also included in FIG. 1A are timing diagrams 170(1)-170(3) that are depicted relative to a reference time 175 for the start of uplink transmissions. In this example, timing diagram 170(1) outlines the timing used in the first wireless coverage area 130 for BS 110, timing diagram 170(3) outlines the timing used in the second wireless coverage area 160 for BS 140, and timing diagram 170(2) outlines the timing used by UE 120. Timing diagram 170(1) has a guard period or timing gap 180(1) while timing diagram 170(3) has a guard period or timing gap 180(2). The gap 180(2) is smaller than gap 180(1) because the cell radius for the second wireless coverage area 160 is smaller than the cell radius for the first wireless coverage area 130, and hence a smaller timing advance (TA) period is needed for the uplink transmission to reach the BS 140 at the start of the uplink reception period 175. To minimize interference in TDD systems according to the techniques described herein, e.g., system 100, the start of downlink transmission times and the start of uplink transmission times are synchronized among base stations, i.e., the transmission start times are intended to be identical.

The time it takes for a transmission to go from BS 110 to UE 120, and vice versa, is indicated by $T_1$. Accordingly, the UE 120 uses a TA shown at 190(1) to compensate for $T_1$. Since the signal is already delayed by $T_1$ when it reaches UE 120, the UE must use a TA of twice $T_1$, i.e., $TA \approx 2 \times T_1$. In conventional TA implementations, an initial TA value is commanded by the BS which is then followed by relative TA adjustments. It is possible that the relative TA adjustment messages are missed by the UE or contain errors such that the message are not decodable by the UE, and as such, at any given time the BS 110 is generally unaware of the TA currently employed by UE 120. Accordingly, when the BS 110 detects that the uplink transmissions are arriving early or late, the BS 110 signals the UE 120 to incrementally advance or retard its TA until uplink transmission reception coincides with time 175.

One of the problems with the TA 190(1) employed by UE 120 is that the uplink transmission by UE 120 starts before the guard period 180(2) begins for the second wireless coverage area 160 shown at 190(2). The interference period 190(2) becomes larger as TA 190(1) grows. Interference also grows as UE 120 and UE 150 move closer to each other.

The interference period 190(2) is a problem for UE 150 because not only will it potentially lose data, it may also inhibit the UE 150 from performing cell search and monitoring (CSM) of downlink neighbor cell transmissions. CSM is required for the network to make good mobility decisions with respect to UEs in the network, e.g., cell handoffs. In one example, the UEs may need to acquire a certain number of cell-specific reference signal (CSRS) symbols on the downlink channel for CSM purposes.

The techniques described herein improve performance in system 100 by limiting the TA, e.g., TA 190(1), to a known or maximum value in order to limit or minimize these interference periods. The TA may be designated based on information known about system 100. For example, in TD-SCDMA and TD-LTE systems the cell radii are a design constraint and are known to the network operator, and may be used to designate the TA for individual UEs. In TD-LTE systems a special subframe format is employed that may be used to restrict or limit the TA as will be described below. Information may be dynamically exchanged between devices in system 100 and ultimately communicated to the individual UEs. The TA may be designated by UE 120, BS 110, system 100, or all three, depending on system design.

Figure 1B:
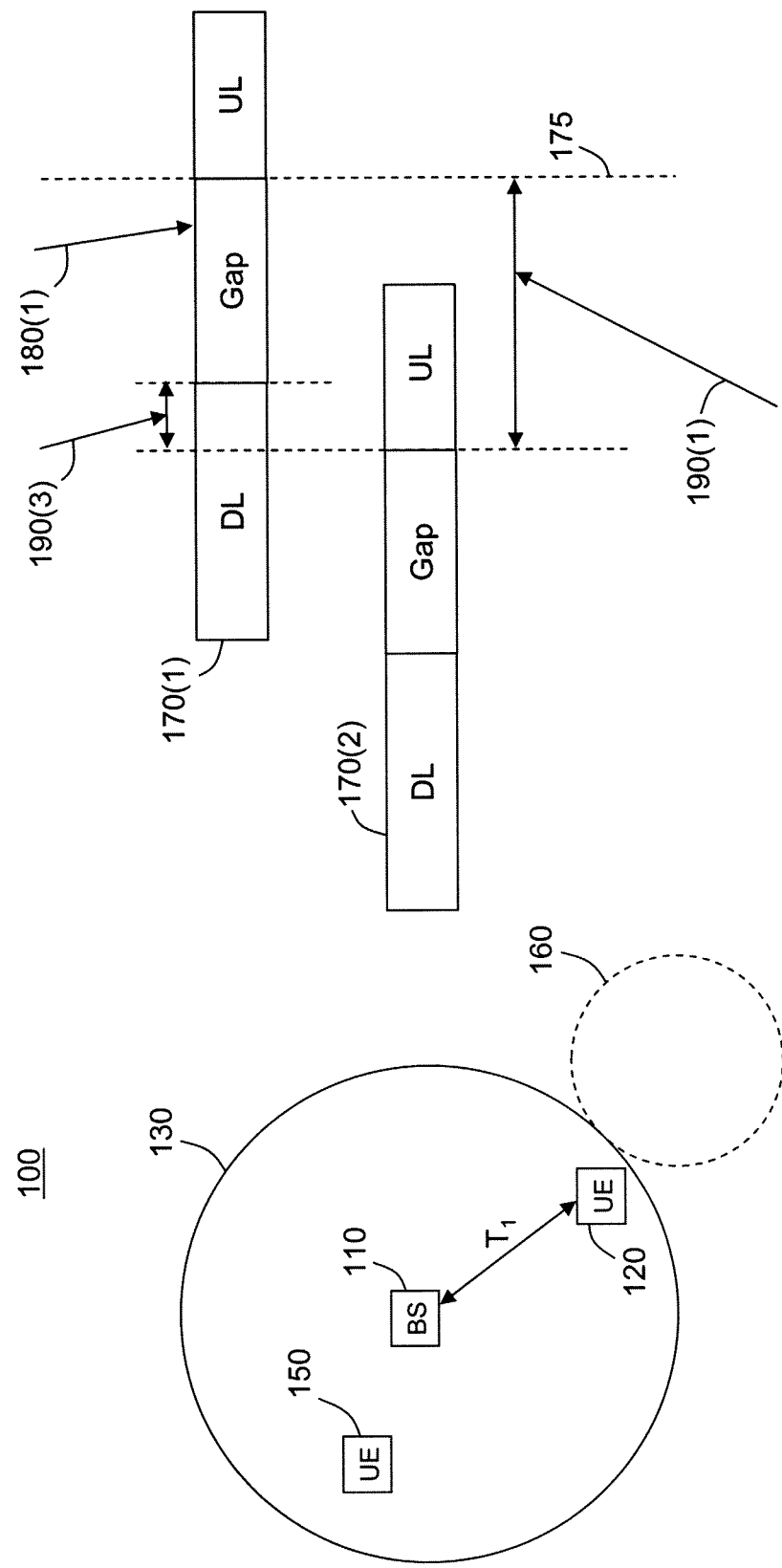
FIG. 1B is a block diagram showing an example of a wireless communication system in which base stations and mobile devices communicate using a TDD scheme in which potential interference within the same cell is mitigated according to the techniques described herein.

FIG. 1B shows system 100 after a period of time. Over time, the UE 150 has moved from wireless coverage area 160 into wireless coverage area 130 and is no longer associated with wireless coverage area 160 as indicated by the dashed circle. In this example, UE 120's TA 190(1) has increased to the point that its uplink transmissions now caused interference within its own cell. This is shown relative to the wireless coverage area 130's timing diagram 170(1) at 190(3). Accordingly, without limiting UE 120's TA, interference may be generated for UEs in the same wireless coverage area, e.g., roamed UE 150. The TA value limiting techniques have been briefly described thus far and will be generally described in connection with FIGS. 2 and 3, and in greater detail in connection with FIGS. 4 and 5.

It is to be understood that FIGS. 1A and 1B are a very simple diagrams designed to illustrate the interference problem and potential solutions to the interference problem. In reality, system 100 has many cells, BSs, UEs, and a plurality of networking and internetworking devices, e.g., routers, gateways, public switched telephone network (PSTN) interconnects, etc. The devices may communicate using known protocols, e.g., Internet Protocol, Radio Resource Control (RRC) protocols, in order to exchange information. The circular cells and cell radii of coverage areas 130 and 160 representative and are not meant to define actual radio frequency (RF) coverage areas. As is well, known the coverage areas may take other shapes, e.g., ellipses or be sectorized, and the actual coverage area is determined by terrain, buildings, by engineering design, etc.

It is to be further understood that FIGS. 1A and 1B are not drawn to scale. The timing diagrams are also not meant to be highly accurate, but only accurate to the point of illustration. For example, the timing 170(2) of the UE is from the UE's perspective and therefore does not necessarily align with the base station timing diagrams 170(1) and 170(3).

Figure 2:
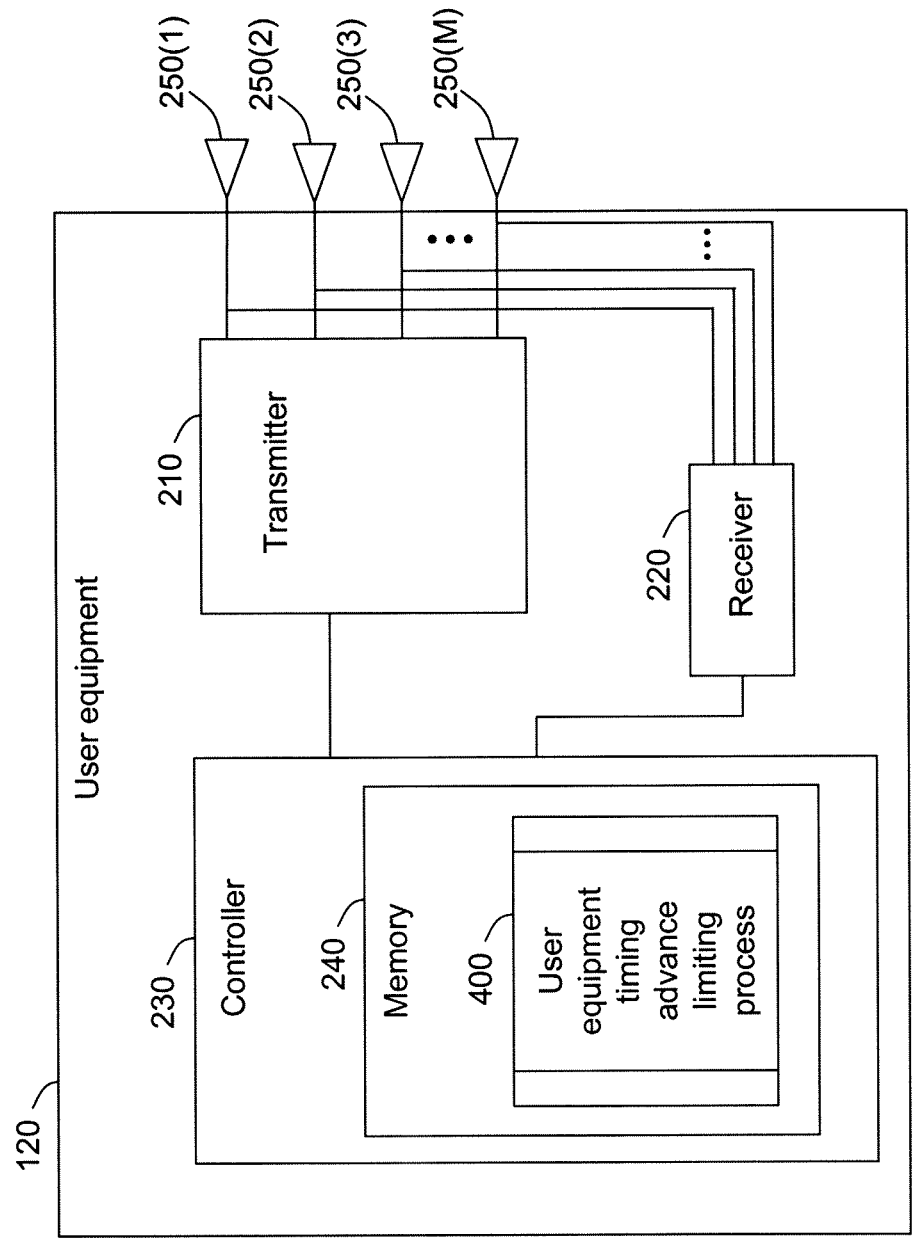
FIG. 2 is an example block diagram of a wireless user equipment device that is configured to designate a timing advance for uplink transmissions according to the techniques described herein.

Referring next to FIG. 2, an example block diagram is shown for a wireless communication device that may serve as a UE 120 and that is configured to execute a UE TA limiting process 400 that limits an interference period. The UE 120 comprises a transmitter 210, a receiver 220, and a controller 230. The controller 230 supplies the data to the transmitter 210 to be transmitted and processes signals received by the receiver 220. In addition, the controller 230 performs other transmit and receive control functionality. Parts of the functions of the transmitter 210, receiver 220, and controller 230 may be implemented in a modem and other parts of the transmitter 210 and receiver 220 may be implemented in radio transmitter and radio transceiver circuits. It should be understood that there are analog-to-digital converters (ADCs) and digital-to-analog converters (DACs) in the various signal paths to convert between analog and digital signals.

The transmitter 210 may comprise individual transmitter circuits that supply respective upconverted signals to corresponding ones of a plurality of antennas (antennas 250(1)-250(M)) for transmission. The receiver 220 receives the signals detected by each of the antennas 250(1)-250(M) and supplies corresponding antenna-specific receive signals to controller 230. It is understood that the receiver 220 may comprise a plurality of receiver circuits, each for a corresponding one of a plurality of antennas. For simplicity, these individual receiver circuits and individual transmitter circuits are not shown.

The controller 230 is a data processing device, e.g., a microprocessor, microcontroller, etc., that comprises a memory 240 or other data storage block that stores data used for the techniques described herein. The memory 240 may be separate or part of the controller 230. Instructions for performing UE TA limiting process 400 may be stored in the memory 240 for execution by the controller 230. The process 400 selects or designates the TA that is used transmit uplink signals supplied to the transmitter 210.

The functions of the controller 230 may be implemented by logic encoded in one or more tangible computer or processor readable media (e.g., embedded logic such as an application specific integrated circuit (ASIC), digital signal processor (DSP) instructions, software that is executed by a processor, etc.), wherein the memory 240 stores data used for the computations described herein (and/or to store software or processor instructions that are executed to carry out the computations described herein). Thus, the limiting process 400 may be implemented with fixed logic or programmable logic (e.g., software/computer instructions executed by a processor or field programmable gate array (FPGA)).

Figure 3:
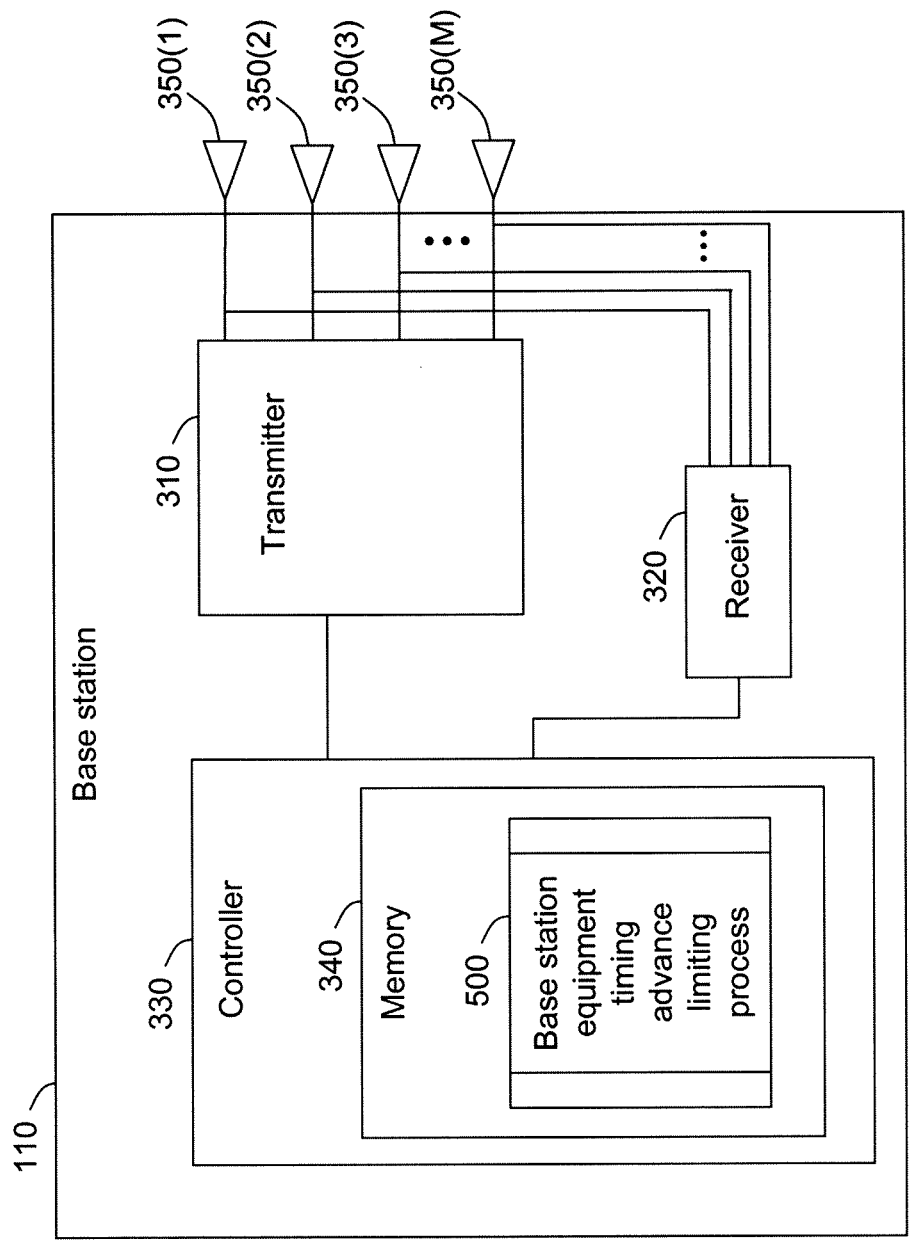
FIG. 3 is an example block diagram of a wireless base station device that is configured to determine a timing advance for uplink transmissions of a wireless user equipment device according to the techniques described herein.

Referring to FIG. 3, an example block diagram is shown for a wireless communication device that may serve as a BS 110 and that is configured to execute a BS TA limiting process 500 that limits an interference period. The BS 110 comprises a transmitter 310, a receiver 320, a controller 330, and a memory 340. The functionality of the transmitter 310, receiver 320, controller 330, and memory 340, may be implemented as described with respect to the like components shown in FIG. 2. The process 500 performs functions similar to that of process 400, i.e., process 500 limits a TA according to the techniques described herein, but is adapted to a BS instead of a UE.

Figure 4:
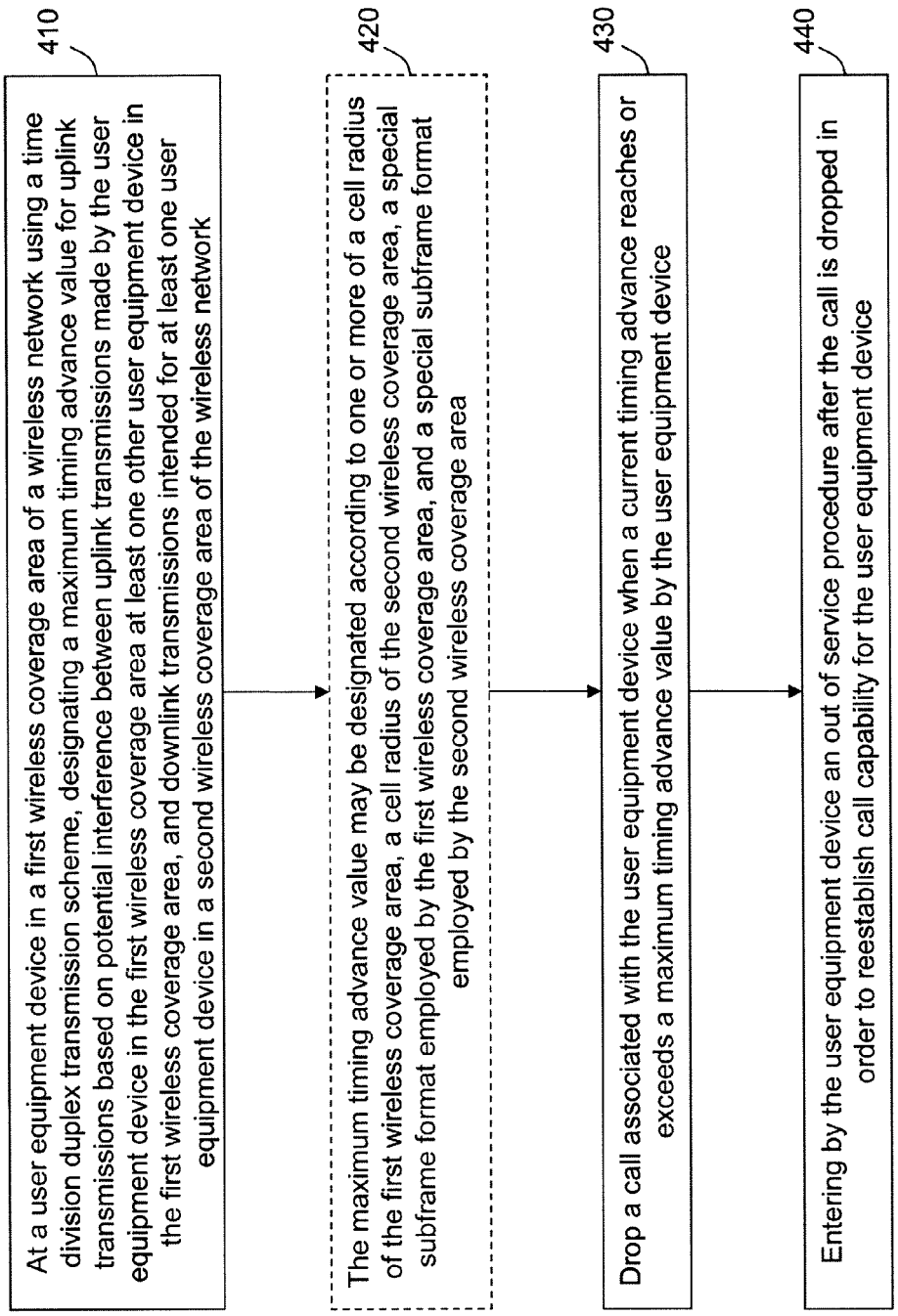
FIG. 4 is a flow chart depicting a process a user equipment device configured to designate a maximum timing advance.

Referring to FIG. 4, a flow chart depicting the UE TA limiting process 400 will now be described. At step 410, the UE device, e.g., UE 120, designates a maximum timing advance value for uplink transmissions to a value based on potential interference between uplink transmissions made by the UE device in the first wireless coverage area or at least one other UE device in the first coverage area and downlink transmissions intended for at least one UE device, e.g., UE 150, in a second wireless coverage area of the wireless network. The maximum timing advance value may also be based on potential interference that may be caused by any UE including UE 120. At 420, the maximum timing advance value may be designated based on one or more of a cell radius of the first wireless coverage area, a cell radius of the second wireless coverage area, a special subframe format employed by the first wireless coverage area, and a special subframe format employed by the second wireless coverage area, or combinations thereof. Step 420 is an optional step that may be performed in connection with step 410 as indicated in the figure by the dashed box.

In this example, the cell radii of the first and second coverage areas determine TAs that may need to be employed their respective coverage areas. Accordingly, the TA value for UE 120 may be based on the radius of the first wireless coverage area, the radius of the second wireless coverage area which may be bigger or smaller than the first wireless coverage area, or a combination of both, e.g., differences between the radii or size of the coverage areas. Alternatively, the TA value may be based on information contained within a subframe, e.g., a special subframe that is used in the first or second wireless coverage areas.

To further illustrate the subframe concept, certain frames contain special sets of information. For example, after the first downlink subframe is transmitted, the base station transmits a downlink pilot timeslot/channel (DwPTS) message. Following the DwPTS message is the guard period or interval, e.g., gaps 180(1) and 180(2) from FIG. 1A. Following the guard period is an uplink pilot timeslot/channel (UpPTS) message. The guard period can be used by the UE to calculate maximum cell size for its serving cell as well as for neighboring cells. In addition, TD-LTE allows for up to eight special subframe formats. The special subframe formats (SSFs) dictate the size of the DwPTS message, the length of the guard period, and the size of the UpPTS message. Accordingly, the special subframe format can be used to generate or designate a maximum TA value for the UE in order to limit interference.

SSFs may be defined according to section 4.2 of the 3$^{rd}$ Generation Partnership Project (3GPP) Technical Specification (TS) 36.211. The SSFs may be obtained by the UE via a System Information Block (SIB)-1 message transmitted by the base station. The BS may also use the SIB-1 message to transmit SSFs used in the neighboring cells or merely indicate that the neighboring cell's SSF is the same or different from that of the serving cell. This scheme would allow the UE to select or designate its TA or a maximum TA, e.g., using an algorithm or lookup table.

In another example, a message is received from the wireless network comprising information indicating the value of the maximum timing advance. A common maximum TA may be broadcast by a base station covering the first wireless coverage area to all UEs in the first wireless coverage area. Alternatively, the base station covering the first wireless coverage area may signal a user equipment device-specific maximum TA value to each user equipment device in the first wireless coverage area. The maximum TA value may also be designated based on the location of the user equipment device in the first wireless coverage area. For example, as the UE roams throughout the first coverage area, e.g., coverage area 130, the neighboring cells closest to the UE may change, and the maximum TA value may be designated accordingly.

The user equipment device may also send messages to the base station comprising information configured to indicate a current timing advance value employed at the user equipment device. The current TA can be used by the base station to monitor and coordinate mobility handoffs for UEs within its coverage area. The messages could, e.g., be periodic where the period could be fixed or designated/signaled by the basestation, or sending the messages could be event-driven. Event-triggered reports could be generated 1) when the TA reaches a value signaled by the base station, 2) when the TA reaches a value corresponding to the minimum SSF gap size (across the different configurations), or 3) when the TA reaches a value corresponding to the serving cell SSF gap size. Variants of events 2) and 3) could be obtained by using a margin on these values, i.e., trigger a report when the TA reaches the limit value minus a given "margin" value. Other criteria may be used to trigger a report. Section 5.1 in 3GPP TS 36.214 defines a receive (Rx)-transmit (TX) time difference that is reported by the UE. The Rx-TX time difference can be used to determine a TA currently used by the UE.

Referring again to FIG. 4, at step 430, a call associated with the user equipment device may be dropped when a current timing advance reaches the maximum timing advance value of the user equipment device. The call may be dropped by either the BS or the UE may drop the call of its own initiative. Alternatively, the UE may report to the base station that it is reaching its maximum TA and the base station takes appropriate action. In a preferred option, the UE is instructed to perform a hand-over procedure to transfer the UE to another cell to maintain connectivity. When the base station decides action is necessary, the BS may instruct the UE to hand-over to another cell, change operating frequency, or allocate UE data within subframes that are not adjacent to the downlink-to-uplink transmission transition point (e.g., a point near interference area 190(2) as shown in FIG. 1A). The base station may end up dropping the call if it is unable to perform other radio resource management options such as a hand-over procedure. The base station may initiate these changes by way of a radio resource management command.

At step 440, the UE device enters an out of service procedure after the call is dropped in order to reestablish call capability for the user equipment device. The UE may establish new call capability using a random access channel (RACH) and thereby establish a new TA value that is suitable for its new serving cell. It is possible that the UE may attempt to re-establish call capability with its original serving cell. To this end, a waiting period or temporary time restriction may be placed on the UE to prevent it from establishing a call to the base station in the first wireless coverage area and repeating the dropped call procedure.

In another example, the user equipment device detects a time of arrival and/or received signal strength of signals transmitted from wireless coverage areas neighboring the first wireless coverage area. For example, a BS in a neighboring wireless coverage area, e.g., BS 140 in coverage area 160, transmits signals and the timing advance value is designated based on the times of arrival and/or received signal strengths of those signals, i.e., location information may be obtained. Information on UE location techniques can be found, e.g., in the 3GPP Technical Report (TR) 25.907 "Evaluation of pathloss technologies for Location Services (LCS)". This location information could be used by the UE to decide when to generate a TA report to the base station.

Figure 5:
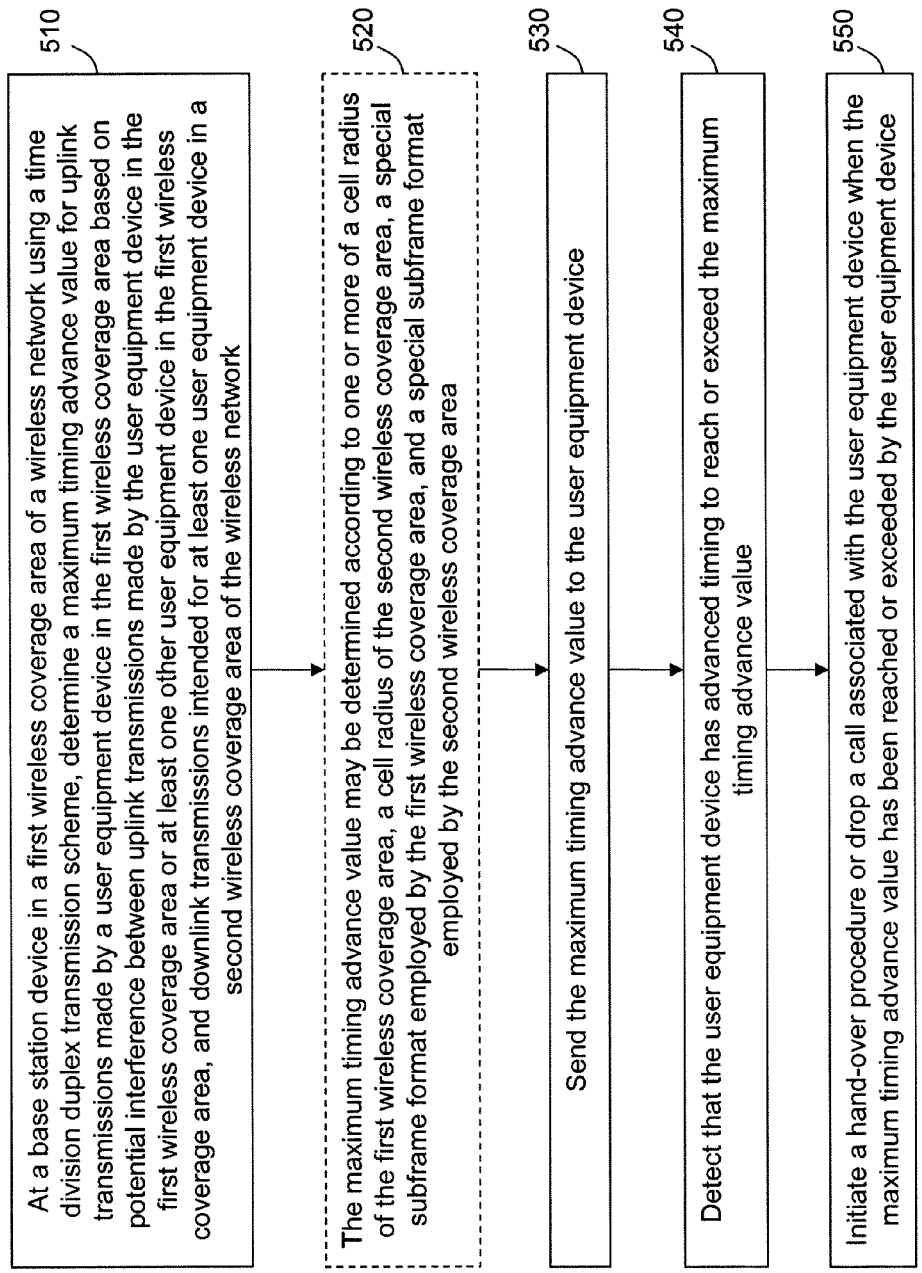
FIG. 5 is a flow chart depicting a process for a wireless base station device configured to determine a maximum timing advance for a wireless user equipment device.

Referring now to FIG. 5, a flow chart depicting the base station TA limiting process 500 will now be described. At step 510, the BS device, e.g., BS 110, determines a maximum timing advance value for uplink transmissions by a user equipment device in the first wireless coverage area based on potential interference between uplink transmissions made by the user equipment device in the first wireless coverage area or at least one other UE device in the first wireless coverage area, and downlink transmissions intended for at least one UE device, e.g., UE 150, in a second wireless coverage area of the wireless network. At step 520, the maximum timing advance value may be determined based on one or more of a cell radius of the first wireless coverage area, a cell radius of the second wireless coverage area, a special subframe format employed by the first wireless coverage area, and a special subframe format employed by the second wireless coverage area, as described above. Step 520 is an optional step that may be performed in connection with step 510 as indicated in the figure by the dashed box. The maximum TA values may be determined based on the location, e.g., a geolocation, of the UE within the BS's coverage area, as described above. Alternatively, maximum TA value may be defined in terms of a number CSRS symbols for downlink communication. The BS may also specify the number of CSRS symbols to be used for CSM operations.

At step 530, the maximum timing advance value is sent to the UE. The UE may then set its internal TA within the range limited by the maximum TA value. The base station may send a common or UE specific maximum TA values, or establish a range of TA values. At some point in time, the UE's actual/current TA approaches the maximum TA value. The UE will be unable to respond to timing adjustment messages sent by the base station that attempt to increase the UE's TA after the UE reaches its maximum TA. The UE may signal the BS that it is approaching or has reached its maximum TA. At step 540, the base station covering the first wireless coverage area detects that the maximum timing advance value has been reached by the user equipment device, e.g., when the UE no longer responds to a message configured to increase the UE's TA or the BS receives a message from the UE. At step 550, the base station initiates a hand-over procedure or drops a call associated with the UE when the maximum timing advance value has been reached by the UE. Other actions may be taken as described above.

The BS may be further configured to reject attempts by the UE to reestablish communication by placing a temporary time restriction on UEs that have been dropped. The BS may further receive a messages comprising information configured to indicate wireless properties of the second wireless coverage area, and determine the maximum timing advance value based on the wireless properties. The properties could include cell radius, location of UEs in the second coverage area, as well as special subframe formats that are in use.

In sum, techniques are disclosed herein for a user equipment device in a first wireless coverage area of a wireless network using a time division duplex transmission scheme to designate a timing advance value for uplink transmissions based on potential interference between uplink transmissions made by the user equipment device in the first wireless coverage area or at least one other user equipment device the first wireless coverage area and downlink transmissions intended for at least one user equipment device in a second wireless coverage area of the wireless network. The maximum timing advance value may be based on relative cell radii or other cell properties of the first and second wireless coverage areas. A base station may determine the maximum timing advance and transmit the maximum timing advance to the user equipment device.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A method for reducing interference in a wireless network, comprising:
    at a user equipment device in a first wireless coverage area of the wireless network using a time division duplex transmission scheme, limiting a timing advance value for uplink transmissions to a maximum value that is less than a guard period for the first wireless coverage area based on potential interference caused by uplink transmissions made by the user equipment device in the first wireless coverage area or at least one other user equipment device in the first wireless coverage area to downlink transmissions intended for at least one user equipment device in a second wireless coverage area of the wireless network,
    wherein the wireless network communicates via a time division long term evolution (LTE) communication scheme and the maximum timing advance value is limited according to at least one of a cell radius of the first wireless coverage area and a cell radius of the second wireless coverage area,
    employing a current timing advance value which is less than or equal to the maximum value to transmit data, via LTE, from the user equipment device to a base station of the first wireless coverage area; and
    sending a message to a base station from the user equipment device in the first wireless coverage area comprising information configured to indicate the current timing advance value employed at the user equipment device, the message being configured to allow the base station to take an appropriate action to prevent the user equipment device in the first wireless coverage area from causing interference.

2. The method of claim 1, wherein the maximum timing advance value is limited according to at least one of a special subframe format employed by the first wireless coverage area and a special subframe format employed by the second wireless coverage area.

3. The method of claim 1, wherein the wireless network communicates via a synchronous time division multiple access communication (TD-SCDMA) scheme and the maximum timing advance value is limited according to at least one of a cell radius of the first wireless coverage area and a cell radius of the second wireless coverage area.

4. The method of claim 1, wherein limiting the maximum timing advance value comprises receiving a message comprising information configured to indicate the maximum timing advance value that can be employed by the user equipment device in the first wireless coverage area.

5. The method of claim 4, wherein a plurality of user equipment devices are serviced by the first wireless coverage area, and receiving the message comprises:
    receiving the message comprising information configured to indicate the maximum timing advance which is specific to one user equipment device or common to all the user equipment devices in the first wireless coverage area.

6. The method of claim 1, wherein limiting comprises limiting the maximum timing advance value based on a location of the user equipment device in the first wireless coverage area.

7. The method of claim 1, further comprising dropping a call when the maximum timing advance value has been reached by the user equipment device in the first wireless coverage area.

8. The method of claim 7, further comprising entering an out of service procedure when the call is dropped in order to reestablish call capability for the user equipment device in the first wireless coverage area.

9. The method of claim 7, further comprising placing a temporary time restriction on the user equipment device in the first wireless coverage area to prevent the user equipment device in the first wireless coverage area from establishing a call via a base station covering the first wireless coverage area.

10. The method of claim 1, wherein the first wireless coverage area and the second wireless coverage area are neighboring wireless coverage areas, and further comprising detecting at least one of a time of arrival and received signal strength of signals transmitted from the second wireless coverage area, and wherein limiting comprises limiting the maximum timing advance value according to at least one of the time of arrival and the received signal strength.

11. The method of claim 1, wherein the first and the second wireless coverage areas are the same wireless coverage area.

12. A method comprising:
    at a base station device in a first wireless coverage area of a wireless network using a time division duplex transmission scheme, determining a maximum timing advance value that is less than a guard period for the first wireless coverage area for uplink transmissions made by a user equipment device in the first wireless coverage area based on potential interference caused by uplink transmissions made by the user equipment device in the first wireless coverage area or at least one other user equipment device in the first wireless coverage area to downlink transmissions intended for at least one user equipment device in a second wireless coverage area of the wireless network, wherein the wireless network communicates via a time division long term evolution (LTE) communication scheme and the maximum timing advance value is determined according to at least one of a cell radius of the first wireless coverage area and a cell radius of the second wireless coverage area, receiving at the base station, via LTE, data transmitted by the user equipment device employing a current timing advance value which is less than or equal to the maximum value to transmit data; and receiving a message at the base station from the user equipment device in the first wireless coverage area comprising information configured to indicate the current timing advance value employed at the user equipment device, the message being configured to allow the base station to take an appropriate action to prevent the user equipment device in the first wireless coverage area from causing interference.

13. The method of claim 12, wherein the maximum timing advance value is determined according to at least one of a special subframe format employed by the first wireless coverage area a special subframe format employed by the second wireless coverage area.

14. The method of claim 12, wherein the wireless network communicates via a synchronous time division multiple access communication (TD-SCDMA) scheme and the maximum timing advance value is determined according to at least one of a cell radius of the first wireless coverage area and a cell radius of the second wireless coverage area.

15. The method of claim 12, wherein a plurality of user equipment devices are serviced by the first wireless coverage area, and further comprising broadcasting the maximum timing advance value to the plurality of user equipment devices in the first wireless coverage area.

16. The method of claim 12, wherein a plurality of user equipment devices are serviced by the first wireless coverage area and determining comprises determining a specific timing advance value for one of the plurality of user equipment devices, and further comprising sending the specific maximum timing advance value to the one user equipment device in the first wireless coverage area.

17. The method of claim 12, further comprising receiving a message at the base station device comprising information configured to indicate wireless properties of the second wireless coverage area, and wherein determining comprises determining the maximum timing advance value based on the wireless properties.

18. The method of claim 12, wherein determining comprises determining the maximum timing advance value based on a location of the user equipment device in the first wireless coverage area.

19. The method of claim 12, further comprising:
detecting the maximum timing advance value has been reached by the user equipment device in the first wireless coverage area; and
performing an appropriate action to mitigate the potential interference when a current timing advance of the user equipment device in the first wireless coverage area reaches the maximum timing advance value.

20. The method of claim 19, wherein performing comprises performing at least one of initiating a hand-over procedure, changing an operating frequency, allocating UE data within subframes that are not adjacent to a downlink-to-uplink transmission transition point, and dropping a call associated with the user equipment device in the first wireless coverage area when the current timing advance reaches the maximum timing advance value for the user equipment device in the first wireless coverage area.

21. The method of claim 19, further comprising placing a temporary time restriction on the user equipment device in the first wireless coverage area to prevent the user equipment device in the first wireless coverage area from establishing a call via the base station covering the first wireless coverage area when the call is dropped.

22. The method of claim 12, wherein the first and the second wireless coverage areas are the same wireless coverage area.

23. A processor readable storage media, storing instructions that, when executed by a processor, cause the processor to:
limit a timing advance value for uplink transmissions to a maximum value that is less than a guard period for a first wireless coverage area based on potential interference caused by uplink transmissions made by at least one user equipment device in the first wireless coverage area to downlink transmissions intended for at least one user equipment device in a second wireless coverage area of the wireless network,
wherein the wireless network communicates via a time division long term evolution (LTE) communication scheme and the maximum timing advance value is limited according to at least one of a cell radius of the first wireless coverage area and a cell radius of the second wireless coverage area,
employ a current timing advance value which is less than or equal to the maximum value to transmit data, via LTE, from the user equipment device to a base station of the first wireless coverage area; and
send a message comprising information configured to indicate the current timing advance value, the message being configured to allow a base station to take an appropriate action to prevent interference.

24. The processor readable storage media of claim 23, wherein maximum timing advance value is limited according to at least one of a special subframe format employed by the first wireless coverage area and a special subframe format employed by the second wireless coverage area.

25. The processor readable storage media of claim 23, wherein the wireless network communicates via a synchronous time division multiple access communication (TD-SCDMA) scheme and the maximum timing advance value is limited according to at least one of a cell radius of the first wireless coverage area and a cell radius of the second wireless coverage area.

26. The processor readable storage media of claim 23, wherein the instructions operable to limit comprise instructions to receive a message from the wireless network comprising information indicating a value of the maximum timing advance.

27. The processor readable storage media of claim 23, wherein the instructions operable to limit comprise instructions to limit the maximum timing advance value based on a location of a user equipment device in the first wireless coverage area.

28. The processor readable storage media of claim 23, further comprising instructions operable to initiate a hand-over procedure, change operating frequency, allocate user equipment data within subframes that are not adjacent to a downlink-to-uplink transmission transition point, or drop a call associated with the at least one user equipment device in the first wireless coverage area when a current timing advance reaches or exceeds a maximum timing advance value used by the at least one user equipment device in the first wireless coverage area.

29. The processor readable storage media of claim 23, further comprising instructions operable to enter an out of service procedure after a call is dropped in order to reestablish call capability for the at least one user equipment device in the first wireless coverage area.

30. The processor readable storage media of claim 23, further comprising instructions operable to receive a message comprising information configured to indicate wireless properties of the second wireless coverage area, and wherein instructions operable to designate comprise instructions to limit a maximum timing advance value based on the wireless properties.

31. The processor readable storage media of claim 23, further comprising instructions operable to detect at least one of a time of arrival and received signal strength of signals transmitted from wireless coverage areas neighboring the first wireless coverage area including the second wireless coverage area, and wherein instructions operable to limit comprise instructions to limit a maximum timing advance value based on the times of arrival and the received signal strengths.

* * * * *